United States Patent [19]
Dover

[11] Patent Number: 6,023,888
[45] Date of Patent: *Feb. 15, 2000

[54] DOOR AND WINDOW CHANNEL SEAL

[75] Inventor: Harold Phillip Dover, Maryville, Tenn.

[73] Assignee: Schlegel Corporation, Rochester, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/719,988

[22] Filed: Sep. 25, 1996

[51] Int. Cl.$^7$ .................................................... E05D 15/16
[52] U.S. Cl. ........................... 49/441; 49/490.1; 49/495.1
[58] Field of Search .......................... 49/440, 441, 490.1, 49/475.1, 495.1

[56] References Cited

U.S. PATENT DOCUMENTS

| | | | |
|---|---|---|---|
| 4,649,668 | 3/1987 | Skillen et al. | 49/441 X |
| 4,843,763 | 7/1989 | Mesnel | 49/490.1 X |
| 4,970,828 | 11/1990 | Mesnel et al. | 49/440 X |
| 5,010,689 | 4/1991 | Vaughan | 49/490.1 X |
| 5,343,609 | 9/1994 | McManus . | |
| 5,475,947 | 12/1995 | Dupuy | 49/440 X |

FOREIGN PATENT DOCUMENTS

| | | |
|---|---|---|
| 403854 | 12/1990 | European Pat. Off. . |
| 540183 | 5/1993 | European Pat. Off. . |
| 2588035 | 4/1987 | France . |
| 2635814 | 2/1990 | France . |
| 49515 | 3/1983 | Japan ..................................... 49/440 |

*Primary Examiner*—Jerry Redman
*Attorney, Agent, or Firm*—Harter, Secrest & Emery LLP; Stephen B. Salai

[57] ABSTRACT

A combination door and window channel seal for sealing between a motor vehicle door frame and movable window glass panel and a method for forming the same are described. The channel seal is formed from thermoplastic elastomers of at least two different durometer values and has an elastic joint in a window run channel portion of the seal.

18 Claims, 3 Drawing Sheets

DOOR AND WINDOW CHANNEL SEAL

FIELD OF THE INVENTION

This invention relates generally to motor vehicle door and window channel seals and more particularly to a thermoplastic elastomer seal having an elastic joint in a window run channel portion of the seal for sealing between a motor vehicle door frame and movable window glass panel, and to a method of forming the seal.

BACKGROUND OF THE INVENTION

The motor vehicle industry, particularly the passenger car and van portions of the industry, are increasingly relying on flush glass window mounting for improving the appearance of motor vehicles and reducing the aerodynamic drag of the vehicles to make them more fuel efficient. A number of conflicting requirements for such seals makes them difficult and expensive to produce and install. The increasingly complex shape of motor vehicle bodies requires seals that are not simply bent in a plane to surround the top edge of a flat glass window. The seals are formed not only at the radii (corners of the glass) but are also arched vertically to coincide with the curved top surface of the glass and rounded sides of the automobile.

Heretofore, thermosetting materials such as ethylene-propylene-diene-monomer rubber (EPDM) have been used extensively for vehicle window seals. Some complex seals have included portions formed from other materials such as thermoplastic materials, but EPDM has usually been a major portion of the seal. To improve the appearance of motor vehicles, the industry demands window seals that are colored to enhance the appearance of the vehicle, usually by matching the body color. Obtaining a color on EPDM has been less than satisfactory in the past, whereas thermoplastics are readily colored.

Although EPDM is cost effective (inexpensive) as a material, the total cost of making and installing an EPDM seal on a motor vehicle is high. The seal must not only be formed at the radii of the glass by cutting, mitering or welding molded pieces, but it must also be arched in the vertical direction to coincide with the curved glass and rounded sides of the vehicle. To accomplish this with EPDM, a metal support internal to the EPDM is added, usually as the EPDM seal is extruded. Massive and expensive roll forming machinery and tooling and stretch bending equipment and tooling are required to form the extruded seal to the desired configuration in three dimensions. Thus, the total cost, that is the cost of the seal and the capital cost of equipment needed to form it, is high.

It is an object of this invention to provide an improved vehicle door and window channel seal that overcomes the disadvantages of known seals by providing a semi-rigid seal which readily conforms to the desired configuration and allows for a closing action on the window glass. The seal of the invention comprises a channel seal which is a substantially rigid but flexible channel seal and is thermally formed from at least two different polymers, coming together into one profile. The channel seal is preferably used in conjunction with a sealing insert.

More particularly, it is an object of the invention to improve the sealing action against the glass by incorporating an elastic joint of TPE of lower durometer in the base of the channel seal to provide a winking action when a window engages the sealing insert and causes the legs of the window run channel to pivot inwards and compress the sealing insert against the window glass.

Ii is an object of the invention to provide a door and window channel seal in which the channel seal comprises a combination of thermoplastic elastomer (TPE) materials of different durometers which attaches to a vehicle body and can be color matched to an automobile and which can be thermally formed to match the general contour of the vehicle, thus eliminating the need for the expensive, massive, roll forming machinery and tooling and stretch bending equipment and tooling mentioned before.

The channel seal can be thermally formed by extrusion or molding in one piece and conformed to the general contour of the vehicle opening. Thus molded joint lines and the need for cutting, mitering or welding of the carrier member to fit the corners are avoided. The sealing insert can be formed by extrusion of a one-piece, relatively flat resilient rubber member which can be readily provided with a sliding surface, such as a slip coating or flocking.

SUMMARY OF THE INVENTION

Briefly stated and in accordance with a presently preferred embodiment of the invention a combination door and window channel seal comprising, an inverted U-shaped window channel defined by a first base having first and second ends, a first leg attached to one end of the base, an elastic joint strip attached to the second end of the base, and a second leg attached to the elastic joint; and a U-shaped flange engaging channel for securing the seal to a door flange defined by a second base, said second leg and a third leg.

In accordance with another aspect of this invention the channel seal comprises a pivot projection attached to the first end of the base, opposite the first leg.

In accordance with another aspect of this invention, the channel seal comprises at least two thermoplastic elastomers of different durometer values.

In accordance with another aspect of this invention, the channel seal is formed by coextruding the at least two thermoplastic elastomers.

In accordance with another aspect of this invention, the channel seal is formed by molding the at least two thermoplastic elastomers.

In accordance with another aspect of this invention the channel seal comprises a thermoplastic elastomer selected from styrenic block copolymers, rubber-polyolefin blends, elastomeric alloys, thermoplastic alloys, thermoplastic elastomeric alloys, thermoplastic ionomers, thermoplastic polyurethanes, polyvinyl chlorides and blends thereof.

The novel aspects of the invention are set forth with particularity in the appended claims. The invention itself, together with further objects and advantages thereof may be more fully comprehended by reference to the following detailed description of a presently preferred embodiment of the invention taken in conjunction with the accompanying drawings.

DETAILED DESCRIPTION OF THE INVENTION

Figure 1:
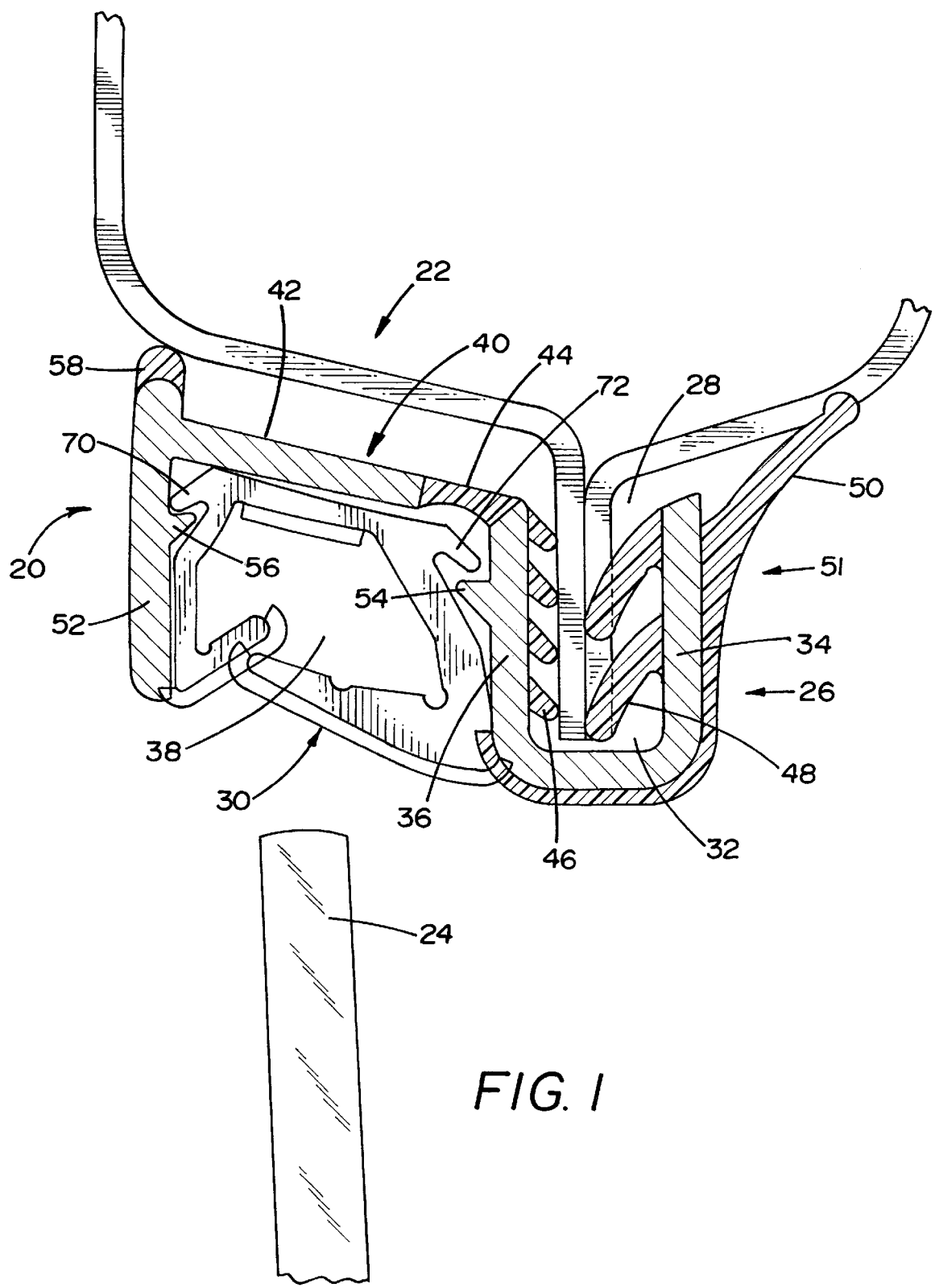
FIG. 1 is a section of a channel seal in accordance with the invention before a window is engaged.

A combination door and window channel seal for a motor vehicle in accordance with this invention is shown in cross section in FIG. 1. The channel seal 20 mounts to a door window frame 22 of a motor vehicle to engage three sides of a moveable window glass 24. The fourth side of the window glass that remains within the door or body of the vehicle is sealed by a belt line seal usually mounted thereon.

The channel seal 20 cooperates with a resilient window engaging sealing insert 30. The channel seal 20 has a generally U-shaped body member 26 adapted to engage a flange 28 surrounding the window opening of the motor vehicle. The body member 26 has a flange engaging U-shaped first channel 32 formed between an outer leg 34 and an inner leg 36. The inner leg 36 forms a portion of the broader inverted U-shaped window run channel 38. The base 40 of the inverted U-shaped window run channel portion of the seal has a substantially rigid strip 42 and an integral elastic joint strip 44. In addition, the flange engaging U-shaped channel 32 is preferably provided with one or more soft gripping projections 46 and 48 for firmly securing the seal to the vehicle body. Projection 50 on the surface 51 of the U-shaped body member 26 of the channel seal 20 which faces the interior of the vehicle forms another seal to the vehicle body.

The legs 36, 52 of the window run channel 38 have inwardly depending locking extensions 54, 56 for engaging the insert 30. In a preferred embodiment of the channel seal 20 a pivot projection 58 at the end of leg 52 extends above the base 40 and engages the frame 22. The pivot projection 58 provides a point about which the channel seal 20 can pivot when a window glass 24 engages the insert 30 and deflects the elastic joint strip 44.

Figure 2:
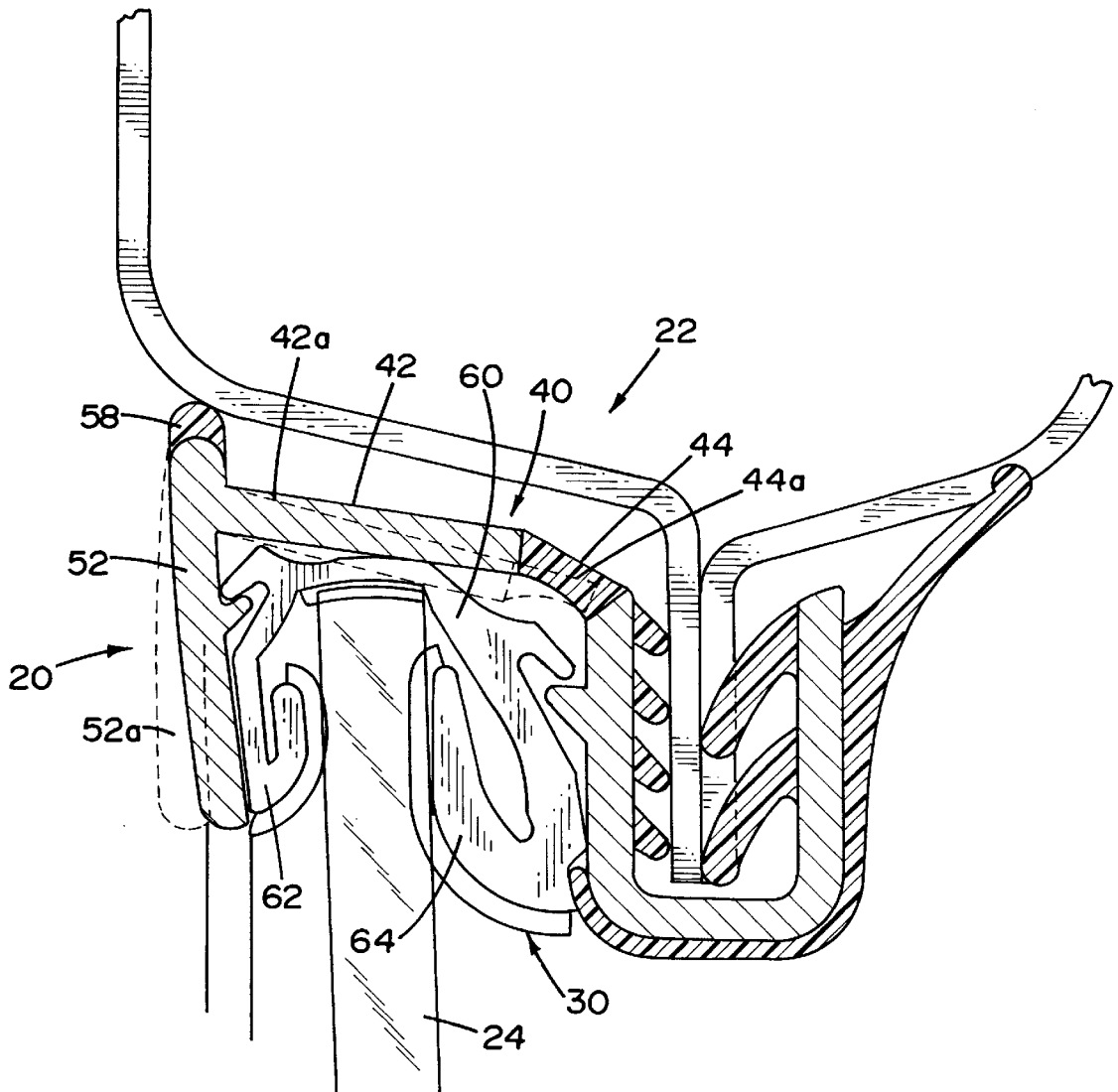
FIG. 2 is a section of a channel seal in accordance with the invention after a window is engaged.

FIG. 2 illustrates the effect of engaging a window glass 24 with the insert 30. Pressure exerted by the window glass on the base 60 of the insert 30 deflects the base 60 against the rigid strip 42 of channel seal base 40. The resultant pressure on the channel seal base 40 causes the elastic joint 44 to stretch and base 40 to move toward the frame 22. Simultaneously, as base 40 moves toward frame 22, leg 52 pivots inwardly about projection 58 and squeezes the leg extensions 62 and 64 of insert 30 against the glass 24 in a winking action to form a tighter seal. The dotted lines illustrate the position of the rigid strip 42a, the elastic joint strip 44a and the leg 52a before the window glass 24 is engaged. The elastic joint 44 can also be considered to be a flexible hinge about which the base 40 and leg 36 rotate.

It will be apparent to those with skill in this art that the channel seal of this invention can be adapted to seal with a window glass without using a sealing insert. The window run channel 38 can be provided with one or more sealing lips attached to the insides of legs 36 and 52 for slideably engaging the window glass when the window glass engages the base 40 of the channel seal 20. Such sealing lips could also have a slip coating or flocking on the sliding surface.

The elastic joint strip 44 adjacent to a corner of the channel seal base 40 is advantageous for conforming the channel seal to a corner of the door window frame. The door window frame 22 into which the profile is fitted has a radius at a corner section which is greater than the radius at the pillar section of the frame.

Figure 3:
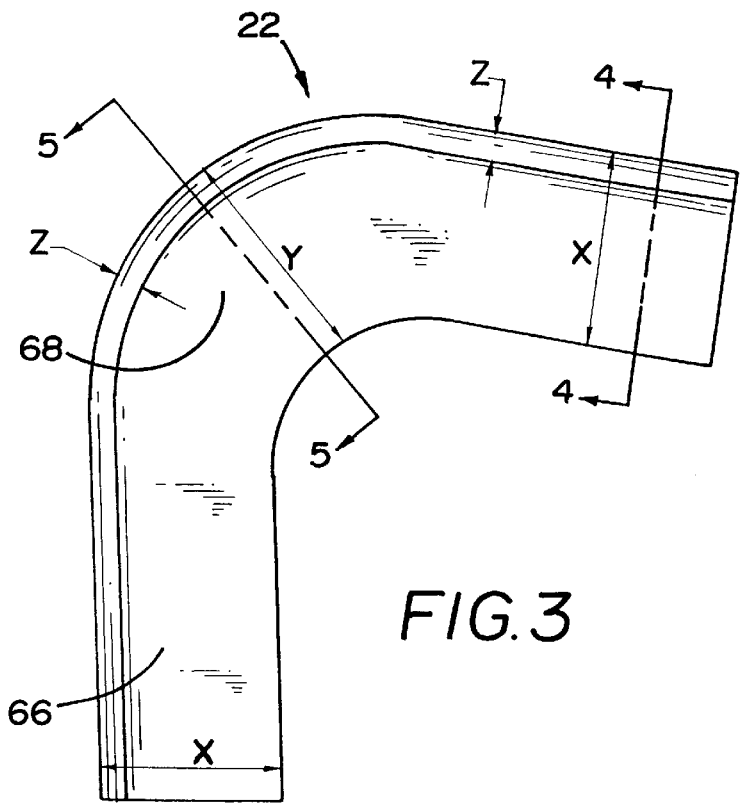
FIG. 3 illustrates the corner profile of the door window frame.

FIG. 3 illustrates the corner profile of the door window frame showing the differential z between the distance x between the bottom of flange 28 and the pillar section 66 of the frame 22 and distance y between the bottom of the flange 28 and the corner section 68 of the frame 22. The elastic joint strip 44 of the channel seal allows the seal to be accommodated in both sections of the frame 22.

Figure 4:
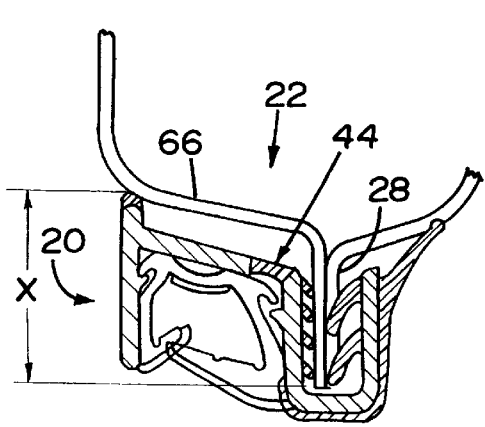
FIG. 4 illustrates a pillar cross section of the flange with a channel seal attached.

Referring now to FIG. 4 there is shown a cross section 4—4 of the door window frame with a channel seal profile attached to the pillar section 66 of frame 22 showing the elastic joint 44 in a normal extruded state and positioned to fit the seal within the distance x of the frame 22.

Figure 5:
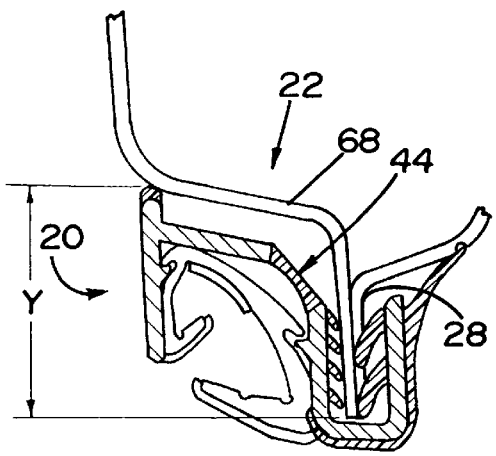
FIG. 5 illustrates a corner cross section of the flange with a channel seal attached.

Referring now to FIG. 5 there is shown a cross section 5—5 of the door window frame with a channel seal profile attached to the corner section 68 of frame 22 showing the elastic joint 44 in a stretched state which permits the seal to fit within the distance y of the frame 22.

The TPE elastic joint allows for corner heat forming which results in a normal extruded shape (Section 4—4) which seals and fits a differential x to also fit, in a stretched state, a corner differential y as shown in Section 5—5.

The channel seal 20 is preferably formed from an extruded profile containing three different polymers, coming together into one profile. In one embodiment of the invention, a semi-rigid TPE material forms the structural shape of the profile; a flexible TPE is colored to match the automobile's interior color scheme, and finally an elastic TPE is extruded for the elastic joint and gripping extensions. To this TPE profile an EPDM rubber extrusion sealing insert is snapped into the glass run channel. This rubber extrusion can either have slip coating or flocking on the surfaces that come into contact with the glass. The soft TPE seals the static sealing area, while the EPDM rubber seals the dynamic area.

In one embodiment of the invention, the semi-rigid TPE forms the generally U-shaped frame comprising the legs 34, 36 and 52, and rigid strip 42 of base 40. An elastic TPE forms the elastic joint strip 44 and projections 46, 48 and 58. A second flexible strip forms the projection 50 and interior facing surface 51 of the channel seal. The interior facing surface 51 can be colored to match the interior of the vehicle.

The resilient sealing insert 30 is mechanically attached within the window run channel by two anchoring lobes 70, 72 that engage the locking extensions 56, 54 to secure the sealing insert in the window run channel 38 of the channel seal 20.

The insert 30, which is preferably but not necessarily manufactured in an open, relatively flat configuration, is bent at its corners and inserted into the glass run channel of the carrier. To aid fitting of the insert it can have multiple slits across its length or it can be punched out at the corners.

The plastic portions of the carrier can be formed from a number of different plastic materials, for example, thermoplastics and thermoplastic elastomers (TPEs). Depending on their hardness TPEs are sometimes categorized as thermoplastics and sometimes as elastomers. For the purpose of this invention no such distinction will be made and hard and soft grades of plastic will all be referred to as TPEs.

TPEs are commercially available in several different brands and types. Each type can be obtained in different grades having different properties such as, hardness, tensile strength, compression, elongation, thermal stability and colorability. Selection of the appropriate TPE for a particular application depends on a suitable combination of such properties.

Types of TPEs which are particularly useful for the channel seal of the invention are the styrenic block copolymers, rubber-polyolefin blends, elastomeric alloys, thermoplastic alloys, thermoplastic elastomeric alloys, thermoplastic ionomers, thermoplastic polyurethanes, polyvinyl chlorides and blends thereof.

Styrenic block copolymers are commercially available in many types (and grades within types), for example, Kraton® from Shell Chemical Co. is based on block copolymers of styrene with a diene or an olefin pair, ethylene-butylene. The diene can be isoprene or butadiene.

The rubber-polyolefin blends (or thermoplastic polyolefins (TPOs)) are blends of various polyolefins with ethylene-propylene rubber (EPR) or ethylene-propylene-diene-monomer (EPDM). Suitable polyolefins include polypropylene and various types of polyethylene. Copolymers of propylene and ethylene and blends of TPOs can also be used. TPOs are also useful as modifiers of other TPEs.

Alloying is an interactive combination of two or more materials to give a material having better properties than those of the corresponding blend. Thermoplastic alloys are available with properties enabling them to be painted. Thermoplastic elastomeric alloys and elastomeric alloys (EAs) are composed of synergistic mixtures of two or more polymers that have been treated to give them properties different from simple blends of the major constituents. The two types of elastomeric alloys are melt processable rubbers (MPRs) and thermoplastic vulcanizates (TPVs).

EA-MPRs are a category of TPEs made of a highly plasticized, single phase combination of a chlorinated polyolefin, an ethylene-vinyl acetate copolymer and an acrylic ester mixture in which the rubber phase is highly crosslinked, for example, Alcryn® from E. I. du Pont Nemours, Inc. EA-TPVs are made of a rubber/plastic polymer mixture in which the rubber phase is fully crosslinked.

The plastic phase of a TPV is commonly a polyolefin (especially polypropylene), and the rubber phase is often an ethylene-propylene elastomer. A particularly useful TPV, suitable for windows seals, is formed from polypropylene and EPDM rubber and is commercially available in several grades as Santoprene® from Monsanto Chemical Co.

Thermoplastic polyurethanes (TPUs) are formed by copolymerization of diisocyanates with long-chain diols and short-chain diols. TPUs are available commercially in a number of types and grades, for example, Texin® from Mobay Corporation, Estane® from B. F. Goodrich Co., Pellethane® from Dow Chemical Corp. and Q-Thane® from K. J. Quinn and Co., Inc.

Polyvinyl chloride (PVC) based TPEs are also suitable for window seals and are available in different grades and blends with other TPEs and rubbers. P-Valloy is one such material available from GBIE (Gerry Bareich Import Export Inc.) of Canada.

Thermoplastic ionomers are polymers containing interchain ionic bonding which affords tough, durable, transparent thermoplastics, for example, Surlyn® from E. I. du Pont de Nemours, Inc.

The substantially rigid plastic portion of the channel seal is preferably formed from a rigid or semi-rigid TPE. A rigid TPE, for example a polypropylene, preferably has a hardness in the range of 30 to 85 durometers, preferably 70 durometers, according to the Shore D scale. A semi-rigid TPE, for example Kraton®, has a hardness between 40 to 90 durometers preferably 70 durometers according to the Shore A scale.

The soft plastic portions of the channel seal are formed from a softer more resilient TPE, for example Santoprene®, having a hardness in the range of 40 to 90 durometers, preferably 70 durometers according to the Shore A scale.

The elastic joint strip is preferably formed from a TPE having a hardness in the range of 40 to 90 durometers, preferably 70 durometers according to the Shore A scale.

Such hard and soft TPEs are readily processed and fabricated, for example, by extrusion or molding and are particularly amenable to coextrusion and simultaneous molding of two or more TPEs of different durometer values. The TPEs are readily colored to match the vehicle either by incorporating pigment or by painting. Directly paintable TPE's have a high surface energy material blended into the base polymer to accept water based paints without any pretreatment. Various hardnesses of this material are available from Ferro Corporation.

The hard TPEs can be made with a high gloss finish, for example a Class A finish or a gloss of at least 60 numerical value when measured at a 60° angle with a gloss meter is readily obtained which is substantially higher than can be obtained with an EPDM rubber seal. This TPE needs to meet the exterior weathering cycle per SAE J1960 with minimum change in color or gloss.

The resilient insert can be formed from a rubber, for example, natural rubber, styrene-butadiene rubber (SBR), ethylene-propylene rubber (EPR) or ethylene-propylene-diene-monomer (EPDM) rubber. EPDM is preferred and exhibits good compression set, durability and resistance to weathering.

In another aspect of the invention there is provided a method for forming a door and window channel seal of the invention in which the thermoplastic elastomer channel seal, for example as described in FIG. 1, is obtained by coextruding the thermoplastic elastomers of different durometer values to form a substantially rigid, channel seal in a one-piece generally U-shaped configuration. The extrusion temperature is generally between about 150° to 250° C., preferably about 200° C. In some applications the extrusion is further subjected to heat forming to conform to the shape of the vehicle body. The heat forming step can stretch the Elastic joint more in the corner of the seal than in the remainder of the seal.

The first post extrusion operation is forming the arches on the end of the extrusion. These curves will match the curvatures of the doors and glass. The arches are bent on each end of the part, allowing a precise fit with the pillars of the door. After the arches are formed, the corners are formed. After the TPE extrusion is formed to fit the door, the EPDM extrusion is snapped into the channel. A segmented strip across the base of the rubber extrusion, allows the extrusion to fit into the corners while maintaining wrinkle free sealing lips.

Installation of the TPE system is easy. The semi-rigid nature of this product allows for rough treatment. The product can be deformed and will snap back into position. When the window is rolled up the geometric design of the profile along with the special TPE material allows for closing action. When the window is rolled up, the elastic joint which is strategically located on the profile is responsible for the winking action when the window comes into contact with the seal. The winking action also occurs in the corner areas, making the seal close tightly on the glass.

The insert member is formed by extruding an elastomer, preferably an EPDM rubber, in a generally flat configuration and curing said extrusion. In a preferred embodiment of the invention the flat extrusion is then provided with a sliding surface, for example, by flocking. The extruded insert is then folded into the U-shaped channel seal to mechanically secure them together, for example, by interlocking the projections of the insert with the extensions of the channel seal.

In another aspect of the invention the thermoplastic elastomer channel seal, for example as described in FIG. 1, is obtained by thermally molding the thermoplastic elastomers of different durometer values to form a substantially rigid, thermoplastic channel seal a one-piece generally U-shaped configuration. The molding temperature is generally between about 150° to 250° C., preferably about 200° C.

This invention thus provides a combination door and window channel seal which is easily formed from substantially rigid and soft TPE's. The elastic joint allows the legs of the channel seal to pivot and form a tight seal with the window glass.

The TPE system with the rubber insert offers the following advantages: a 40% to 50% weight reduction per door; interior color matching; a wide variety in Class A surfaces on exterior surfaces from flat black to high gloss black; exterior color matching is possible. The TPE is environmentally friendly and can be recycled. The soft TPE seals the static sealing area, while the EPDM rubber seals the dynamic area.

The channel seal of the present invention has other advantages. The channel seal formed from substantially rigid thermoplastic material does not require a wire carrier, a stamped metal carrier or a solid metal support and can be provided with a finish gloss as high as 60 compared to rubber which is usually limited to a 20 gloss or less. The assembly requires less labor and capital expenditures not only to produce, but to install. The completed assembly is lighter than the all-rubber assemblies used in the past. Overall, the seal of this invention is more versatile, more attractive, and easier to maintain than known seals.

While the invention has been described in connection with a presently preferred embodiment thereof, those skilled in the art will recognize that many modifications and changes may be made therein without departing from the true spirit and scope of the invention, which accordingly is intended to be defined solely by the appended claims.

What is claimed is:

1. A sealing assembly for a sliding panel that moves toward and away from a confronting surface comprising:

an attaching part for attaching the sealing assembly adjacent to the confronting surface;

a generally L-shaped part having a first leg and a second leg;

an elastic joint connecting the generally L-shaped part to the attaching part at a distal end of the first leg of the generally L-shaped part;

a pivot element on the first leg of the generally L-shaped part, the pivot element being proximate to the juncture of the first and second legs; and a seal being a resilient insert and for engaging the sliding panel, the seal being mounted in the generally L-shaped part and the attaching part, the seal adapted to be moved towards and into firm engagement with the sliding panel by the second leg of the generally L-shaped part when a leading edge of the sliding panel pushes the first leg towards the confronting surface, causing the distal end of the first leg to pivot towards the confronting surface and the second leg to pivot about the pivot element toward the sliding panel.

2. The sealing assembly of claim 1, in which the generally L-shaped part is substantially rigid.

3. The sealing assembly of claim 1, in which the attaching part is U-shaped.

4. The sealing assembly of claim 3, the U-shaped attaching part comprising gripping projections formed on inner sides of the U-shaped attaching part.

5. The sealing assembly of claim 1, in which the seal is a flexible window channel insert.

6. The sealing assembly of claim 5, in which the flexible window channel insert comprises a base having first and second legs, and first and second anchoring lobes for securing the insert between the generally L-shaped part and the attaching part.

7. The sealing assembly of claim 6, the generally L-shaped part and the attaching part having locking extensions for securing the flexible window channel insert.

8. The sealing assembly of claim 1, in which the attaching part comprises a thermoplastic elastomer.

9. The sealing assembly of claim 8, in which the thermoplastic elastomer is at least one member selected from the group consisting of styrenic block copolymers, rubber-polyolefin blends, elastomeric alloys, thermoplastic alloys, thermoplastic elastomeric alloys, thermoplastic ionomers, thermoplastic polyurethane, and polyvinyl chloride.

10. The sealing assembly of claim 5, comprising at least two thermoplastic elastomers of different durometer values.

11. The sealing assembly of claim 10, in which the elastic joint has a durometer value which is softer than a durometer value of the attaching part and the generally L-shaped part.

12. The sealing assembly of claim 10, comprising a coextruded integral unit.

13. The sealing assembly of claim 8, comprising a molded integral unit.

14. The sealing assembly of claim 8, in which the attaching part is substantially rigid.

15. The sealing assembly of claim 11, in which the elastic joint has an intermediate portion thinner than the first leg of the generally L-shaped part.

16. The sealing assembly of claim 1, in which the elastic joint has an intermediate portion thinner than the attaching part.

17. The sealing assembly of claim 1, in which the elastic joint has an intermediate portion thinner than either the first leg of the generally L-shaped part or the attaching part.

18. The sealing assembly of claim 1, in which the L-shaped part and the attaching part are formed from a first material and the elastic joint is formed from a second material, the first and second materials having different durometer values.

* * * * *